United States Patent
Kwak et al.

(10) Patent No.: US 12,490,155 B2
(45) Date of Patent: Dec. 2, 2025

(54) PRIMARY CELL SWITCHING IN ACCORDANCE WITH DOWNLINK CONTROL INFORMATION

(71) Applicant: QUALCOMM Incorporated, San Diego, CA (US)

(72) Inventors: Yongjun Kwak, San Diego, CA (US); Hung Dinh Ly, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 427 days.

(21) Appl. No.: 18/063,385

(22) Filed: Dec. 8, 2022

(65) Prior Publication Data

US 2023/0199585 A1 Jun. 22, 2023

Related U.S. Application Data

(60) Provisional application No. 63/265,743, filed on Dec. 20, 2021.

(51) Int. Cl.
*H04W 36/00* (2009.01)

(52) U.S. Cl.
CPC .............................. *H04W 36/00838* (2023.05)

(58) Field of Classification Search
CPC .................. H04W 72/23; H04W 36/08; H04W 36/00837; H04W 36/06; H04W 36/0083
See application file for complete search history.

(56) References Cited

U.S. PATENT DOCUMENTS

| | | | |
|---|---|---|---|
| 2020/0053610 A1* | 2/2020 | Lyu | H04L 1/1671 |
| 2021/0176012 A1* | 6/2021 | Xu | H04W 72/23 |
| 2021/0203468 A1 | 7/2021 | Yi et al. | |
| 2021/0329677 A1* | 10/2021 | Huang | H04W 24/08 |
| 2022/0053522 A1* | 2/2022 | MolavianJazi | H04L 27/26025 |
| 2022/0312470 A1* | 9/2022 | Seo | H04L 5/0055 |
| 2024/0039681 A1* | 2/2024 | Kim | H04W 72/23 |
| 2024/0195549 A1* | 6/2024 | Han | H04L 5/0053 |
| 2024/0259954 A1* | 8/2024 | Ren | G06N 3/09 |

FOREIGN PATENT DOCUMENTS

| | | |
|---|---|---|
| CN | 113455049 A | 9/2021 |
| WO | 2020164177 A1 | 8/2020 |

OTHER PUBLICATIONS

International Search Report and Written Opinion—PCT/US2022/081285—ISA/EPO—Apr. 18, 2023.

* cited by examiner

*Primary Examiner* — Allahyar Kasraian
(74) *Attorney, Agent, or Firm* — QUALCOMM Incorporated

(57) ABSTRACT

Various aspects of the present disclosure generally relate to wireless communication. In some aspects, a user equipment (UE) may receive, from a network node, downlink control information (DCI) that includes a dynamic primary cell (PCell) switch (DPS) field, wherein the DPS field indicates information associated with PCell switching for a group of UEs including the UE. The UE may determine whether to switch from a first PCell to a second PCell based at least in part on the DPS field in the DCI. Numerous other aspects are described.

30 Claims, 14 Drawing Sheets

800

PRIMARY CELL SWITCHING IN ACCORDANCE WITH DOWNLINK CONTROL INFORMATION

CROSS-REFERENCE TO RELATED APPLICATION

This patent application claims priority to U.S. Provisional Patent Application No. 63/265,743, filed on Dec. 20, 2021, entitled "PRIMARY CELL SWITCHING IN ACCORDANCE WITH DOWNLINK CONTROL INFORMATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for primary cell (PCell) switching in accordance with downlink control information (DCI).

BACKGROUND

Wireless communication systems are widely deployed to provide various telecommunication services such as telephony, video, data, messaging, and broadcasts.

Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a network node, downlink control information (DCI) that includes a dynamic primary cell (PCell) switch (DPS) field, wherein the DPS field indicates information associated with PCell switching for a group of UEs including the UE; and determine whether to switch from a first PCell to a second PCell based at least in part on the DPS field in the DCI.

In some implementations, an apparatus for wireless communication at a network node includes a memory and one or more processors, coupled to the memory, configured to: determine a DPS field that indicates information associated with PCell switching for a group of UEs; and transmit, to a UE in the group of UEs, DCI that includes the DPS field, wherein a decision of whether the UE is to switch from a first PCell to a second PCell is based at least in part on the DPS field in the DCI.

In some implementations, a method of wireless communication performed by a UE includes receiving, from a network node, DCI that includes a DPS field, wherein the DPS field indicates information associated with PCell switching for a group of UEs including the UE; and determining whether to switch from a first PCell to a second PCell based at least in part on the DPS field in the DCI.

In some implementations, a method of wireless communication performed by a network node includes determining a DPS field that indicates information associated with PCell switching for a group of UEs; and transmitting, to a UE in the group of UEs, DCI that includes the DPS field, wherein a decision of whether the UE is to switch from a first PCell to a second PCell is based at least in part on the DPS field in the DCI.

In some implementations, a non-transitory computer-readable medium storing a set of instructions for wireless communication includes one or more instructions that, when executed by one or more processors of a UE, cause the UE to: receive, from a network node, DCI that includes a DPS field, wherein the DPS field indicates information associated with PCell switching for a group of UEs including the UE; and determine whether to switch from a first PCell to a second PCell based at least in part on the DPS field in the DCI.

In some implementations, a non-transitory computer-readable medium storing a set of instructions for wireless communication includes one or more instructions that, when executed by one or more processors of a network node, cause the network node to: determine a DPS field that indicates information associated with PCell switching for a group of UEs; and transmit, to a UE in the group of UEs, DCI that includes the DPS field, wherein a decision of whether the UE is to switch from a first PCell to a second PCell is based at least in part on the DPS field in the DCI.

In some implementations, an apparatus for wireless communication includes means for receiving, from a network node, DCI that includes a DPS field, wherein the DPS field indicates information associated with PCell switching for a group of apparatuses including the apparatus; and means for determining whether to switch from a first PCell to a second PCell based at least in part on the DPS field in the DCI.

In some implementations, an apparatus for wireless communication includes means for determining a DPS field that indicates information associated with PCell switching for a group of UEs; and means for transmitting, to a UE in the group of UEs, DCI that includes the DPS field, wherein a decision of whether the UE is to switch from a first PCell to a second PCell is based at least in part on the DPS field in the DCI.

Aspects generally include a method, apparatus, system, computer program product, non-transitory computer-readable medium, user equipment, network node, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
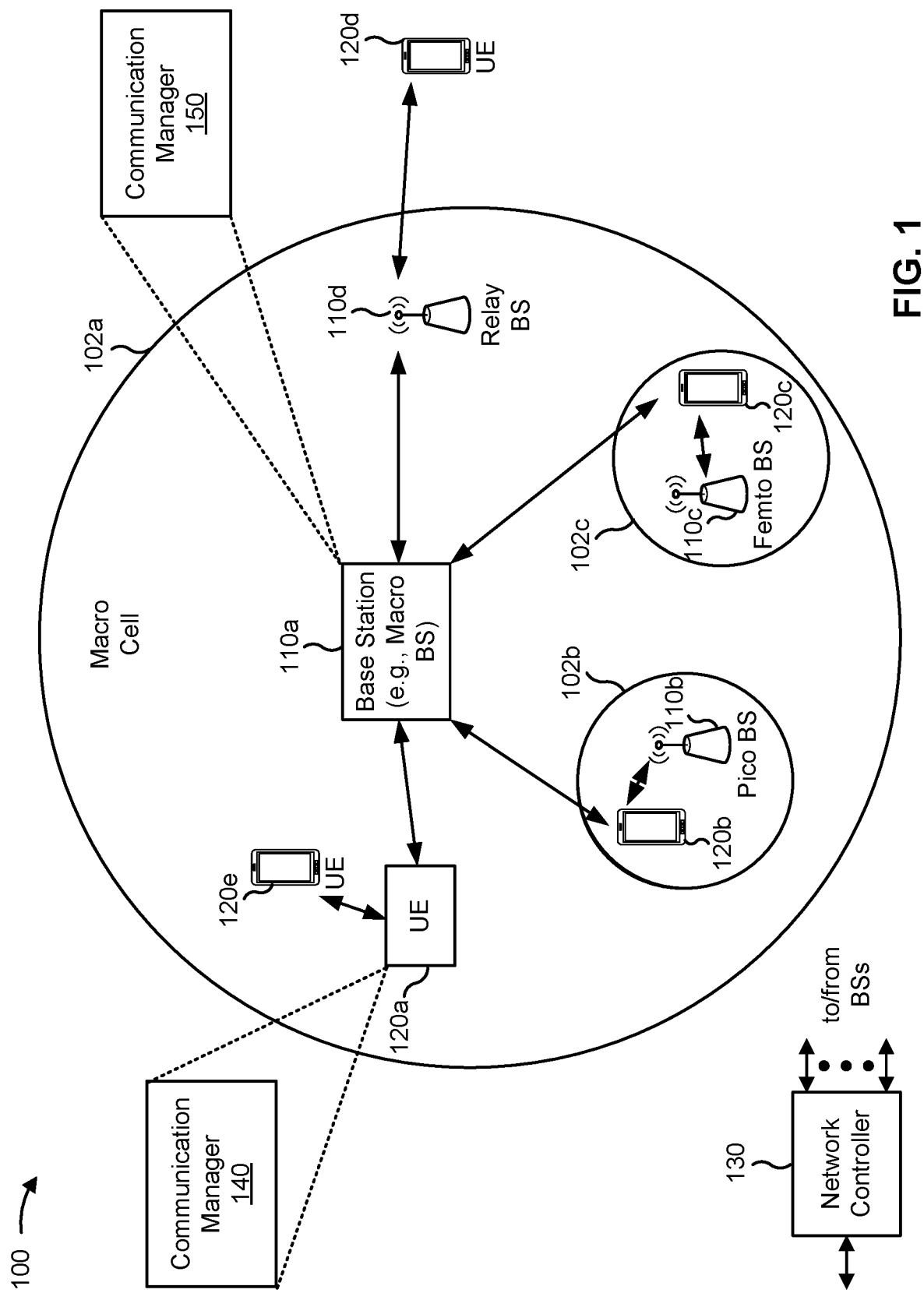
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the terms "base station" (e.g., the base station 110) or "network node" may refer to an aggregated base station, a disaggregated base station, an integrated access and backhaul (IAB) node, a relay node, and/or one or more components thereof. For example, in some aspects, "base station" or "network node" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the base station 110. In some aspects, the terms "base station" or "network node" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations and/or one or more virtual base station functions. For example, in some aspects, two or more base station functions may be instantiated on a single device. In some aspects, the terms "base station" or "network node" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz).

Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a network node, downlink control information (DCI) that includes a dynamic primary cell (PCell) switch (DPS) field, wherein the DPS field indicates information associated with PCell switching for a group of UEs including the UE; and determine whether to switch from a first PCell to a second PCell based at least in part on the DPS field in the DCI. Additionally, or alternatively, the communication manager 140 may perform one or more other operations described herein.

In some aspects, a network node (e.g., base station 110) may include a communication manager 150. As described in more detail elsewhere herein, the communication manager 150 may determine a DPS field that indicates information associated with PCell switching for a group of UEs; and transmit, to a UE in the group of UEs, DCI that includes the DPS field, wherein a decision of whether the UE is to switch from a first PCell to a second PCell is based at least in part on the DPS field in the DCI. Additionally, or alternatively, the communication manager 150 may perform one or more other operations described herein.

As indicated above, FIG. 1 is provided as an example. Other examples may differ from what is described with regard to FIG. 1.

Figure 2:
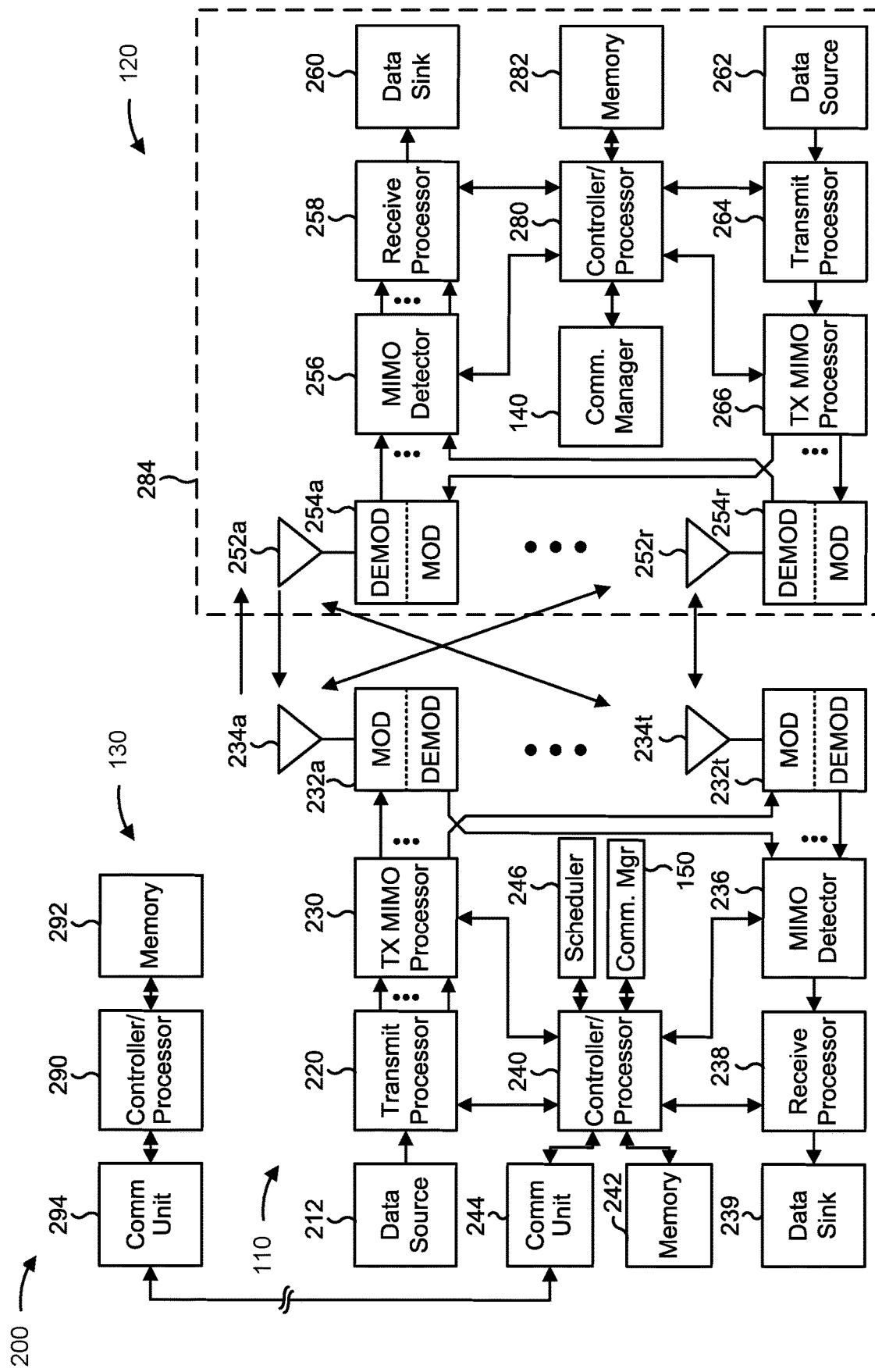
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232.

Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244.

The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-13).

The controller/processor 240 of the base station 110, the controller/processor 280 of the UE 120, and/or any other component(s) of FIG. 2 may perform one or more techniques associated with PCell switching in accordance with DCI, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network node, DCI that includes a DPS field, wherein the DPS field indicates information associated with PCell switching for a group of UEs including the UE; and/or means for determining whether to switch from a first PCell to a second PCell based at least in part on the DPS field in the DCI. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., base station 110) includes means for determining a DPS field that indicates information associated with PCell switching for a group of UEs; and/or means for transmitting, to a UE in the group of UEs, DCI that includes the DPS field, wherein a decision of whether the UE is to switch from a first PCell to a second PCell is based at least in part on the DPS field in the DCI. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

In a carrier aggregation scenario, two component carriers may be used, but the two component carriers may not always be fully needed. For example, when a network traffic load drops below a threshold (e.g., the network traffic load becomes less than 100%), a first component carrier may be sufficient, so a second component carrier may be turned off to achieve network energy saving. In this case, a first serving cell associated with the first component carrier may be used as a primary cell (PCell) for a plurality of UEs, and a second serving cell associated with the second component carrier may be dormant. The second serving cell associated with the second component carrier may be a secondary cell (SCell). The PCell may be common between the plurality of UEs, so that the SCell may be dormant to achieve the network energy saving.

Figure 3:
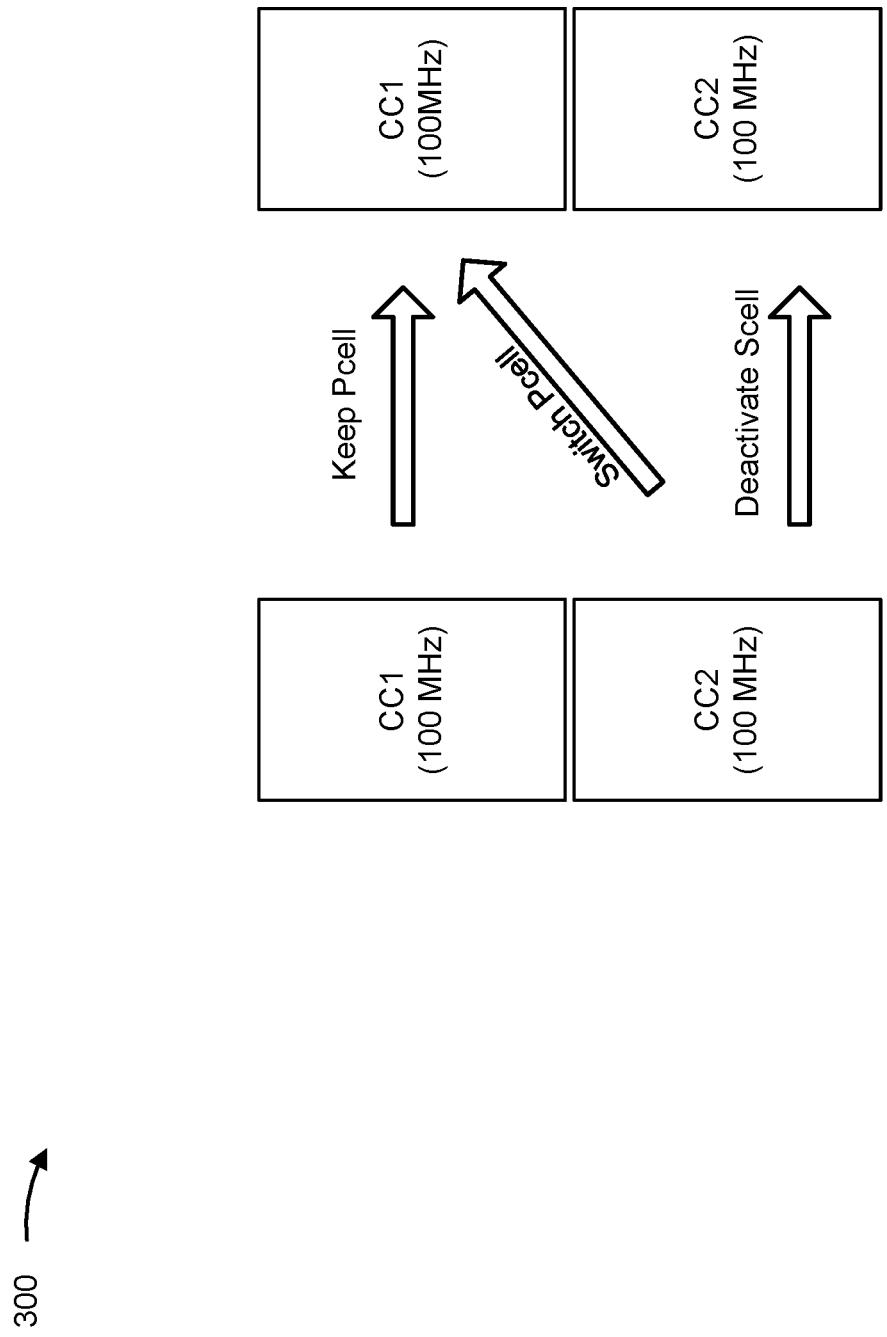
FIGS. 3-4 are diagrams illustrating examples of primary cell (PCell) switching in a carrier aggregation scenario, in accordance with the present disclosure.

FIG. 3 is a diagram illustrating an example 300 of PCell switching in a carrier aggregation scenario, in accordance with the present disclosure.

As shown in FIG. 3, a first component carrier (CC 1) may be used as a PCell by a first UE, and a second component carrier (CC 2) may be used as a PCell by a second UE. Initially, the PCell may be different between different UEs. When a network traffic load between the first component carrier and the second component carrier satisfies a threshold (e.g., the network traffic load drops to be less than a threshold), the first UE may keep the first component carrier as the PCell, but the second UE may switch to the first component carrier as the PCell. After the PCell switching, the first UE and the second UE may both use the first component carrier as the PCell. After the second UE switches to the first component carrier as the PCell, the second component carrier may be associated with an SCell and the second component carrier may be deactivated (or dormant) for network energy saving. The second UE may dynamically switch to the first component carrier as the PCell using a PCell switching mechanism between serving cells, which may enable prompt dormancy of the SCell for network energy saving purposes. The PCell switching mechanism may provide an efficient utilization of component carriers for the network, which may result in energy saving by SCell dormancy when whole component carriers are not needed due to the network traffic load. Further, UEs may benefit from potential power saving due to a reduced quantity of activated component carriers.

As indicated above, FIG. 3 is provided as an example. Other examples may differ from what is described with regard to FIG. 3.

Figure 4:
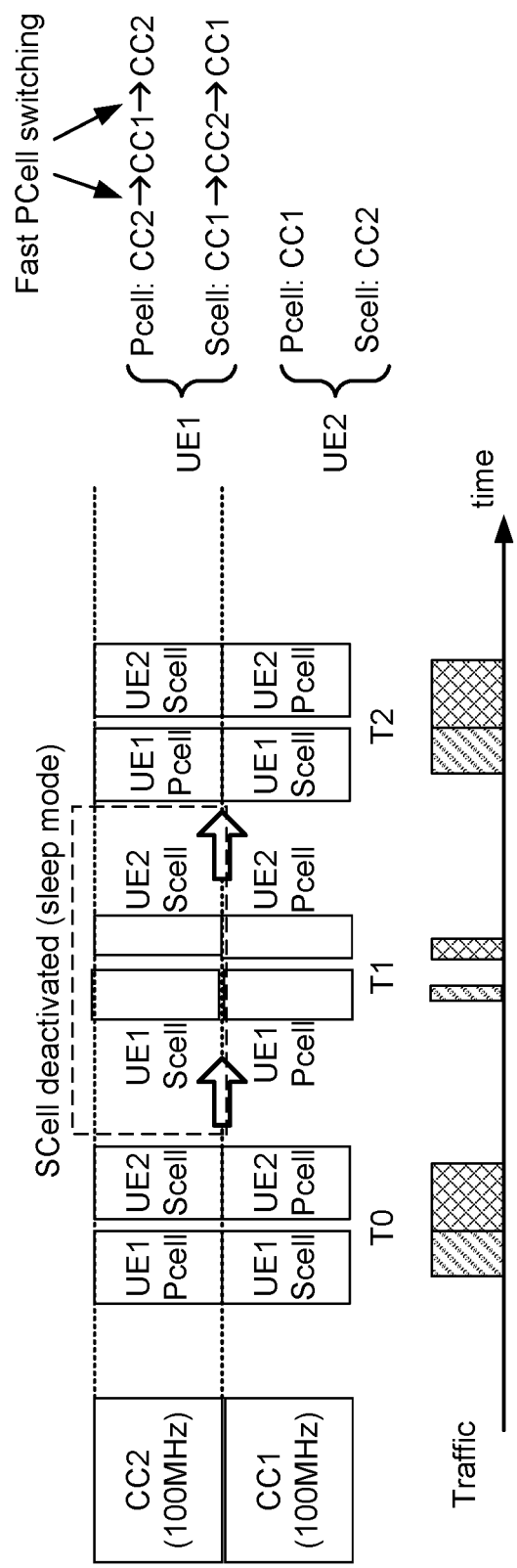

FIG. 4 is a diagram illustrating an example 400 of PCell switching in a carrier aggregation scenario, in accordance with the present disclosure.

As shown in FIG. 4, at a first time point (TO), a first UE (UE1) may use a second component carrier (CC 2) as a PCell and a first component carrier (CC 1) as an SCell. A second UE (UE2) may use the second component carrier as the SCell and the first component carrier as the PCell. At a second time point (T1), one component carrier may be sufficient to cover both the first UE and the second UE, based at least in part on a change to a network traffic load. In this case, the first UE may switch the PCell from the second component carrier to the first component carrier, such that both the first UE and the second UE use the first component carrier as the PCell. The second component carrier may become a deactivated (or dormant) SCell. In other words, the second component carrier may enter a sleep mode, and only the first component carrier may be used as the PCell for both the first UE and the second UE. At a third time point (T3), when the one component carrier is no longer sufficient to cover both the first UE and the second UE due to another change to the network traffic load, the second component carrier may be reactivated and resume serving as the PCell for the first UE.

As shown in FIG. 4, for the second UE, the first component carrier may be associated with the PCell and the second component carrier may be associated with the SCell over a period of time. For the first UE, the second component carrier may be associated with the PCell and the first component carrier may be associated with the SCell at the first time point, the first component carrier may be associated with the PCell and the second component carrier may be associated with the SCell at the second time point, and the second component carrier may be associated with the PCell and the first component carrier may be associated with the SCell at the third time point. Further, PCell switching may occur between the first time point and the second time point, and between the second time point and the third time point.

The PCell switching may involve switching between a PCell and an SCell. During the PCell switching, which may include an SCell dormancy, a target cell may be selected as a PCell for a group of UEs and other serving cells may be switched to dormant SCells for the group of UEs. The PCell switching may be based at least in part on a radio resource control (RRC) reconfiguration or handover. The PCell switching may be a dynamic switching by a layer 1 (L1) or medium access control (MAC) layer.

As indicated above, FIG. 4 is provided as an example. Other examples may differ from what is described with regard to FIG. 4.

Figure 5:
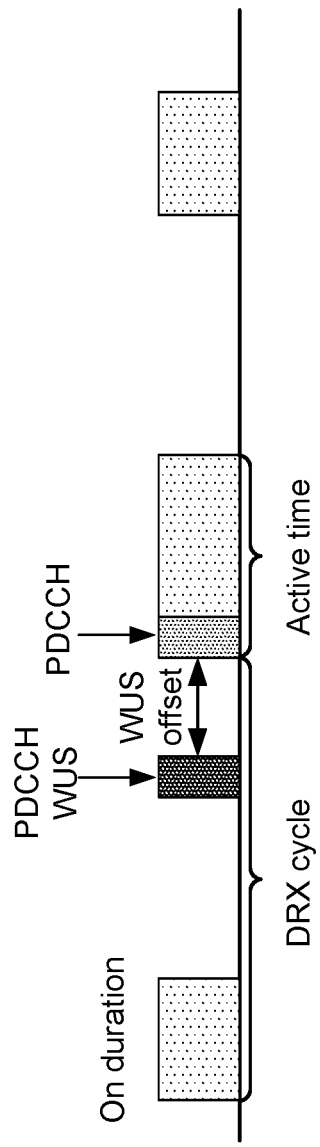
FIG. 5 is a diagram illustrating an example of a discontinuous reception (DRX) operation in a connected state, in accordance with the present disclosure.

FIG. 5 is a diagram illustrating an example 500 of a discontinuous reception (DRX) operation in a connected state, in accordance with the present disclosure.

As shown in FIG. 5, during the DRX operation in the connected state, a DRX cycle may include an ON duration. After the ON duration and within the DRX cycle, a physical downlink control channel (PDCCH) wakeup signal (WUS) may be transmitted in a downlink. A PDCCH transmission may occur during an active time, which may follow the DRX cycle. The PDCCH WUS and the PDCCH transmission may be separated by a WUS offset. The PDCCH WUS may be transmitted outside of the active time.

As indicated above, FIG. 5 is provided as an example. Other examples may differ from what is described with regard to FIG. 5.

Figure 6:
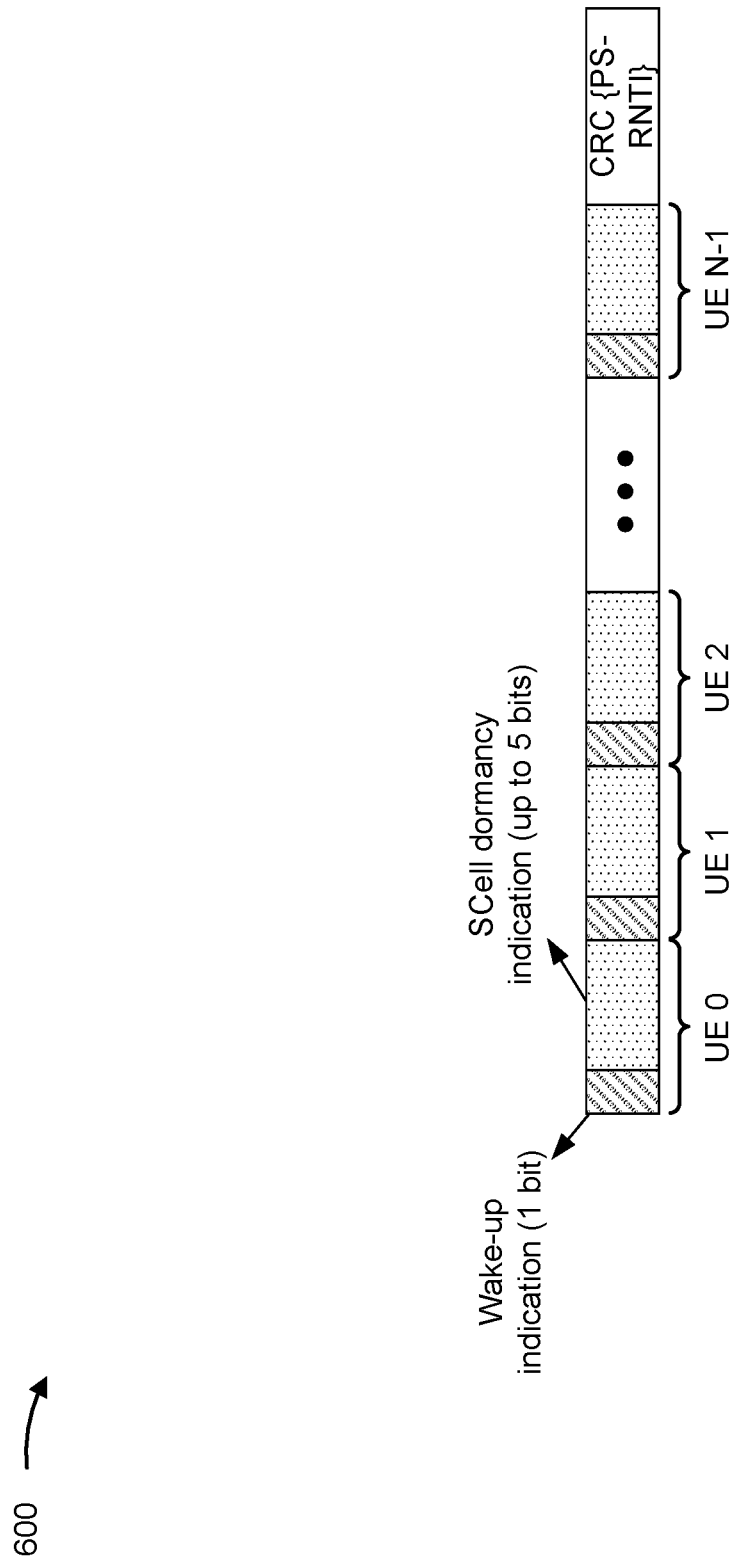
FIG. 6 is a diagram illustrating an example of a dormancy indication outside of an active time, in accordance with the present disclosure.

FIG. 6 is a diagram illustrating an example 600 of a dormancy indication outside of an active time, in accordance with the present disclosure.

As shown in FIG. 6, DCI may indicate a WUS for indication of an SCell dormancy outside of a connected mode DRX (C-DRX) active time. The DCI may be a common DCI for multiple UEs, where each UE may be associated with a portion of the DCI. The DCI may indicate, for a first UE (UE 0), a wakeup indication (one bit) and an SCell dormancy indication (up to five bits corresponding to five cell groups). The SCell dormancy indication may indicate a particular SCell that is dormant. The DCI may indicate, for a second UE (UE 1), a wakeup indication (one bit) and an SCell dormancy indication (up to five bits), and so on. The DCI may indicate a cyclic redundancy check (CRC), which may be based at least in part on a power saving radio network temporary identifier (PS-RNTI).

As indicated above, FIG. 6 is provided as an example. Other examples may differ from what is described with regard to FIG. 6.

Figure 7:
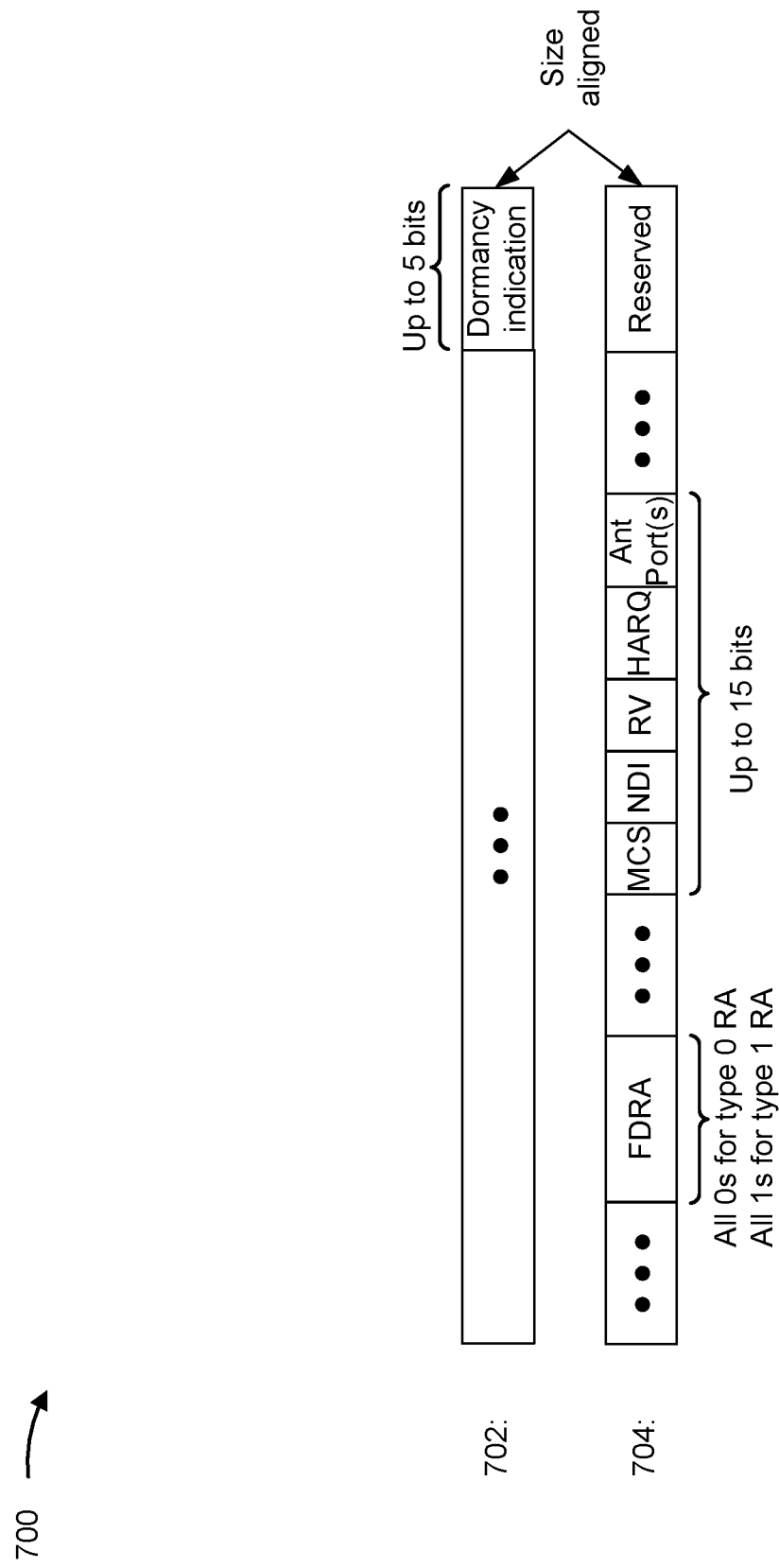
FIG. 7 is a diagram illustrating an example of a dormancy indication inside of an active time, in accordance with the present disclosure.

FIG. 7 is a diagram illustrating an example 700 of a dormancy indication inside of an active time, in accordance with the present disclosure.

As shown by reference number 702, DCI may indicate an SCell dormancy inside of a C-DRX active time. The DCI may schedule data and provide the SCell dormancy indication. The SCell dormancy indication may be up to five bits, which may correspond to five cell groups. In other words, the SCell dormancy indication may indicate a dormancy of up to five SCells.

As shown by reference number 704, DCI may indicate an SCell dormancy inside of a C-DRX active time. The DCI may not schedule data and may only provide the SCell dormancy indication. The DCI may include a frequency domain resource allocation (FDRA) field, which may be all zeros (0s) for a type 0 resource allocation (RA) or all ones (1s) for a type 1 RA. When the FDRA field is type 0, data may not be scheduled and an MCS field, a new data indicator (NDI) field, a redundancy version (RV) field, a hybrid automatic repeat request (HARQ) field, and an antenna port(s) field of the DCI may be repurposed to include the SCell dormancy indication. The MCS field, the NDI field, the RV field, the HARQ field, and the antenna port(s) field, when repurposed, may provide up to 15 bits (corresponding to 15 cell groups) to include the SCell dormancy indication. In other words, the SCell dormancy indication may indicate a dormancy of up to 15 SCells.

As indicated above, FIG. 7 is provided as an example. Other examples may differ from what is described with regard to FIG. 7.

One problem with past approaches is that PCell switching and SCell dormancy indications are separate signaling mechanisms, which may lead to increased signaling overhead. Further, in the past approaches, detailed signaling for the PCell switching may not be configured for certain scenarios, which may result in a UE and a network node being unable to support PCell switching and/or SCell dormancy indications during certain scenarios.

In various aspects of techniques and apparatuses described herein, a UE may receive, from a network node (e.g., a base station), DCI that includes a DPS field. The DPS field may indicate information associated with PCell switching for a group of UEs including the UE. The UE may determine whether to switch from a first PCell to a second PCell based at least in part on the DPS field in the DCI. In some aspects, the UE may perform the PCell switching by switching from the first PCell to the second PCell based at least in part on the DPS field in the DCI. In some aspects, the PCell switching may be indicated along with SCell dormancy in a more efficient manner for certain scenarios. The certain scenarios may depend on whether the PCell switching is indicated along with the SCell dormancy outside or inside of a C-DRX active time. In some aspects, the PCell switching may be indicated along with the SCell dormancy outside of the C-DRX active time, or the PCell switching may be indicated along with the SCell dormancy inside of the C-DRX active time.

Figure 8:
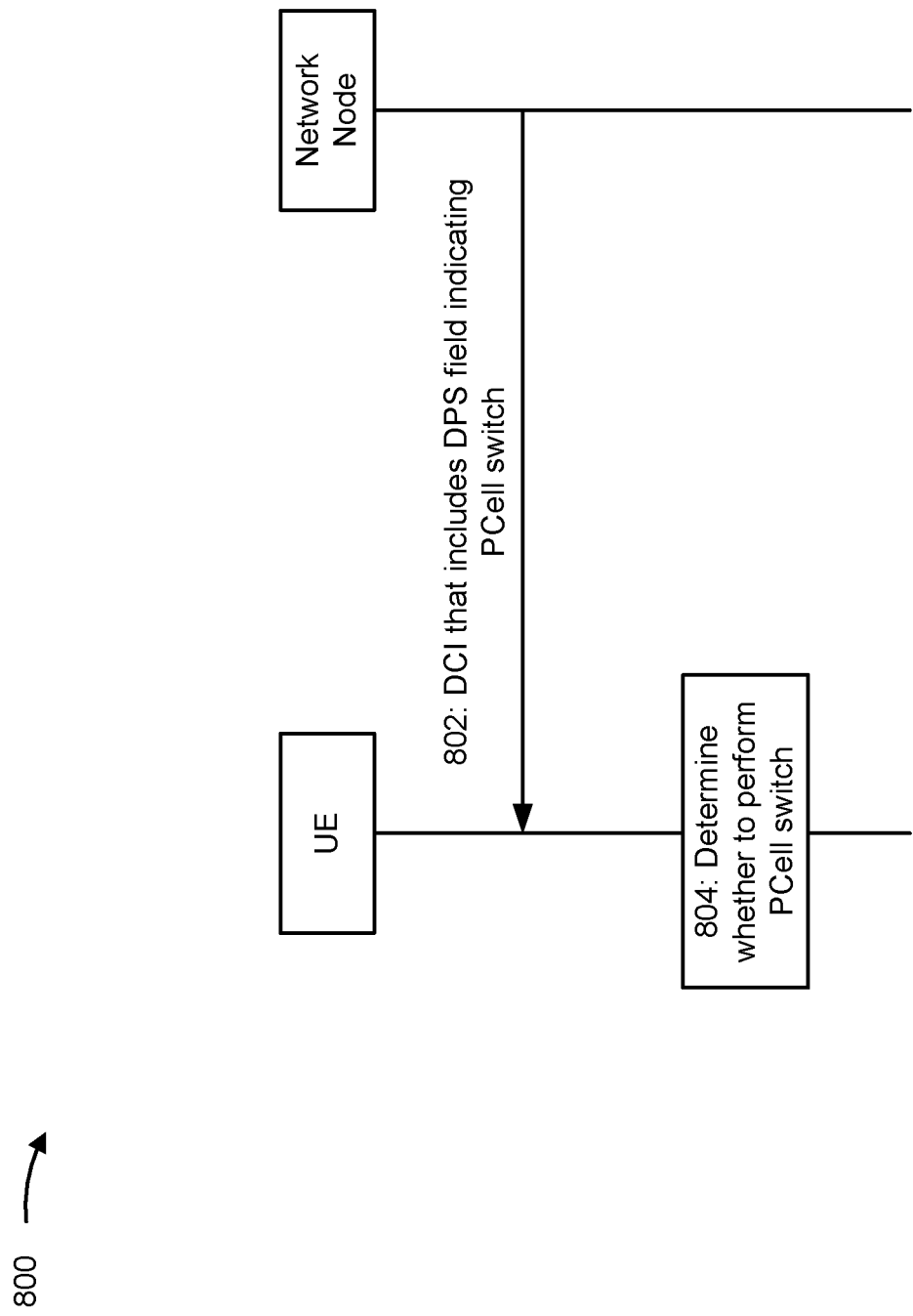
FIGS. 8-9 are diagrams illustrating examples associated with PCell switching in accordance with downlink control information (DCI), in accordance with the present disclosure.

FIG. 8 is a diagram illustrating an example 800 associated with PCell switching in accordance with DCI, in accordance with the present disclosure. As shown in FIG. 8, example 400 includes communication between a UE (e.g., UE 120) and a network node (e.g., base station 110). In some aspects, the UE and the network node may be included in a wireless network, such as wireless network 100.

As shown by reference number 802, the UE may receive, from the network node, DCI that indicates a DPS field. The DPS field may indicate information associated with PCell switching for a group of UEs including the UE. The UE may receive the DCI that includes the DPS field outside of a C-DRX active time. Alternatively, the UE may receive the DCI that includes the DPS field inside of the C-DRX active time. The C-DRX active time may correspond to a time period during which the UE monitors for a PDCCH, which may be transmitted by the network node. In some aspects, the DCI may include a wake-up indication and an SCell dormancy indication for each UE in the group of UEs.

As shown by reference number 804, the UE may determine whether to switch from a first PCell to a second PCell based at least in part on the DPS field in the DCI. In some aspects, the UE may perform the PCell switching based at least in part on a determination to switch from the first PCell to the second PCell, where the determination may be made based at least in part on the DPS field. Alternatively, the UE may not perform the PCell switching, based at least in part on a determination to not switch from the first PCell to the second PCell, where the determination may be made based at least in part on the DPS field.

In some aspects, the DPS field may indicate a physical cell identifier (PCI) associated with the second PCell. The PCI may be associated with a serving secondary cell to be switched to the second PCell. In this case, the UE may perform the PCell switching to switch from the first PCell to the second PCell based at least in part on the PCI associated with the second PCell, as indicated in the DPS field.

In some aspects, the DPS field may indicate a default value to indicate no PCell switching. In some aspects, the DPS field may indicate a PCI of a cell that is not part of active cell groups for the UE, and no PCell switching may be assumed based at least in part on the DPS field indicating the PCI of the cell that is not part of the active cell groups for the UE. In these cases, the UE may not perform the PCell switching based at least in part on the default value or the PCI of the cell, as indicated in the DPS field.

In some aspects, a network node may transmit, to the UE, the DCI inside of the C-DRX active time, where the DCI may indicate the PCell switching. The DCI may include a UE-specific indication of the PCell switching. The indication may indicate a dynamic PCell change via a transmission configuration indicator (TCI) state update or a DPS field. Further, the indication may indicate a dormancy status of a previous PCell (or SCell dormancy), which may or may not be needed for L1 or layer 2 (L2) mobility.

In some aspects, the DCI may be a non-fallback DCI with data scheduling. The DCI may include an SCell dormancy indication per SCell group (e.g., an SCell dormancy indication for each SCell group). The UE may determine whether the first PCell (old PCell or previous PCell) is associated with a dormant SCell based at least in part on the SCell dormancy indication per SCell group. Alternatively, the DCI may include a bit to indicate whether the first PCell is associated with the dormant SCell.

In some aspects, the DCI may be the non-fallback DCI with data scheduling that is transmitted within the C-DRX active time, and the DCI may include the SCell dormancy indication per SCell group. The DCI may include the DPS field, which may indicate a cell to be associated with a new PCell. In some aspects, the DCI may include a one-bit field to indicate whether or not the first PCell has become a dormant SCell. In some aspects, the UE may rely on a cell group SCell dormancy indication to indicate whether or not the first PCell has become the dormant SCell.

In some aspects, the DCI (e.g., DCI format 1_1) may be without data scheduling. The DCI may include an SCell dormancy indication per SCell. A deactivation or dormancy of the first PCell (old PCell or previous PCell) may be indicated using a bit in the DCI associated with the second PCell, and the bit may be associated with a serving SCell to be switched to the second PCell. Alternatively, the DCI may include a bit to indicate whether the first PCell is associated with a dormant SCell.

In some aspects, the DCI may be the DCI format 1_1 without data scheduling that is transmitted within the C-DRX active time, and the DCI may include the SCell dormancy indication per SCell. The DCI may include the DPS field, which may indicate a cell to be associated with the second PCell (new PCell). In some aspects, a position in the DCI associated with an SCell which switches to a PCell (e.g., the second PCell) may be used for indicating a deactivation or dormancy of the first PCell. In other words, since the DPS field may indicate the cell (e.g., the SCell) to be associated with the second PCell and the cell may be one of a plurality of cell groups indicated in the DCI, a bit in the DCI that would otherwise be associated with the cell may be used to indicate the deactivation or dormancy of the first PCell. In some aspects, the DCI may include a one-bit field to indicate whether or not the first PCell has become a dormant SCell.

As indicated above, FIG. 8 is provided as an example. Other examples may differ from what is described with regard to FIG. 8.

Figure 9:
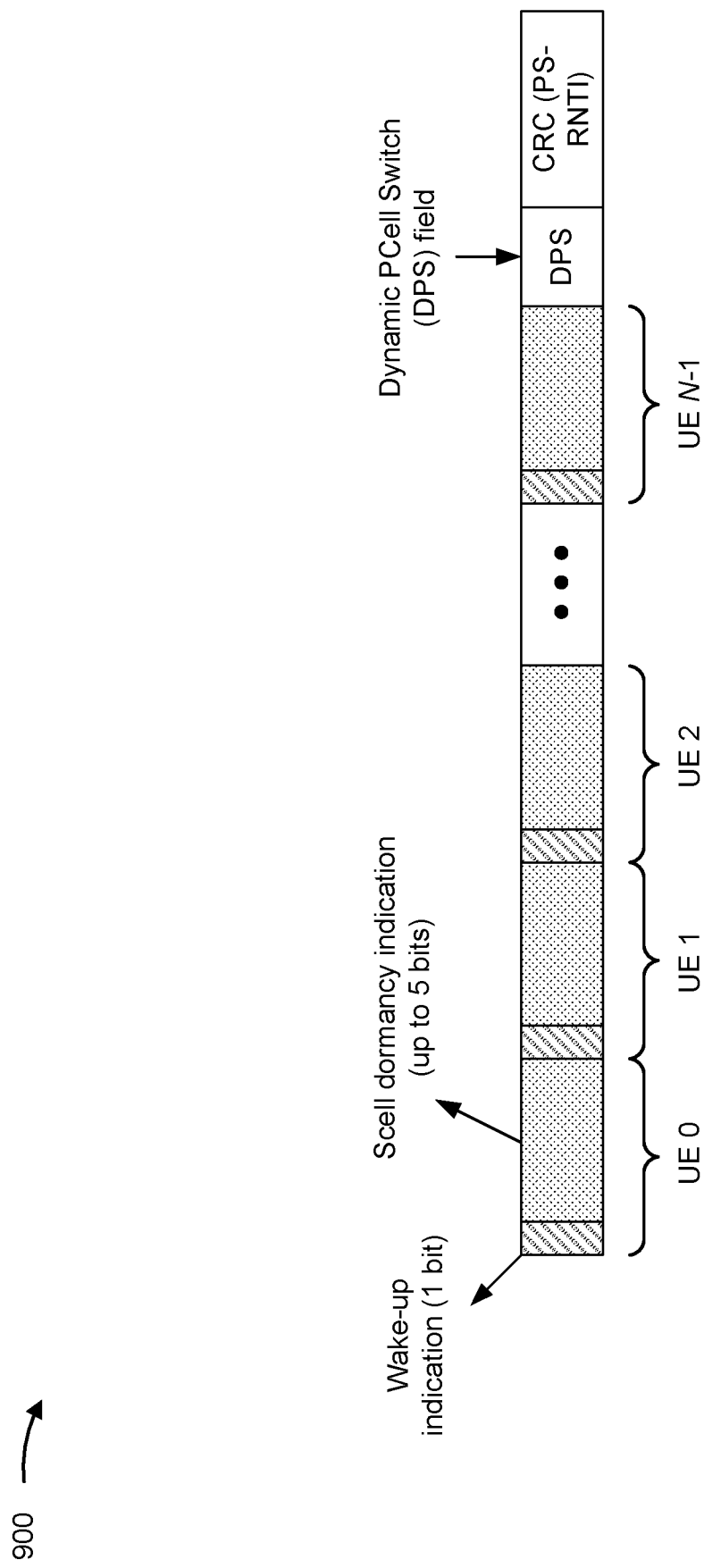

FIG. 9 is a diagram illustrating an example 900 associated with PCell switching in accordance with DCI, in accordance with the present disclosure.

As shown in FIG. 9, a network node may transmit, to a UE, DCI outside of a C-DRX active time, where the DCI may indicate a PCell switching along with an SCell dormancy. The DCI, such as DCI format 2_6, may be a common DCI for multiple UEs. The DCI may include, for each UE, a wakeup indication (one bit) and an SCell dormancy indication (up to five bits). The SCell dormancy indication may indicate one or more SCells that are dormant. Further, the DCI may indicate a DPS field to indicate a dynamic PCell switch to a UE group. The DPS field may be a bit field that serves as a UE group indication. The DPS field may indicate a PCI of a serving SCell to be switched to a PCell. In other words, UEs that receive the DPS field may switch to a cell indicated in the DPS field, where the cell indicated in the DPS field may be associated with the PCell. The UEs that receive the DPS field may switch a previous PCell to the cell indicated in the DPS field, where the cell indicated in the DPS field becomes the new PCell for the UEs and the previous PCell becomes a dormant SCell. The previous PCell that becomes the dormant SCell may or may not be indicated in the SCell dormancy indication. For example, the previous PCell that becomes the dormant SCell may be one of a plurality of cell groups indicated in the SCell dormancy indication.

In some aspects, the DPS field may indicate one default value (e.g., all zeros) to indicate no PCell switching. In this case, the UEs that receive the DPS field with this default value may not perform PCell switching.

In some aspects, when the DPS field indicates a cell that is not part of active cell groups for a UE, the UE may assume that no PCell change is to occur. In other words, the UE may not perform PCell switching when the DPS field indicates that the cell is not part of the active cell groups for the UE. On the other hand, when the DPS field indicates a cell that is part of the active cell groups for the UE, the UE may perform a switch to the cell in accordance with the PCell switching.

As indicated above, FIG. 9 is provided as an example. Other examples may differ from what is described with regard to FIG. 9.

Figure 10:
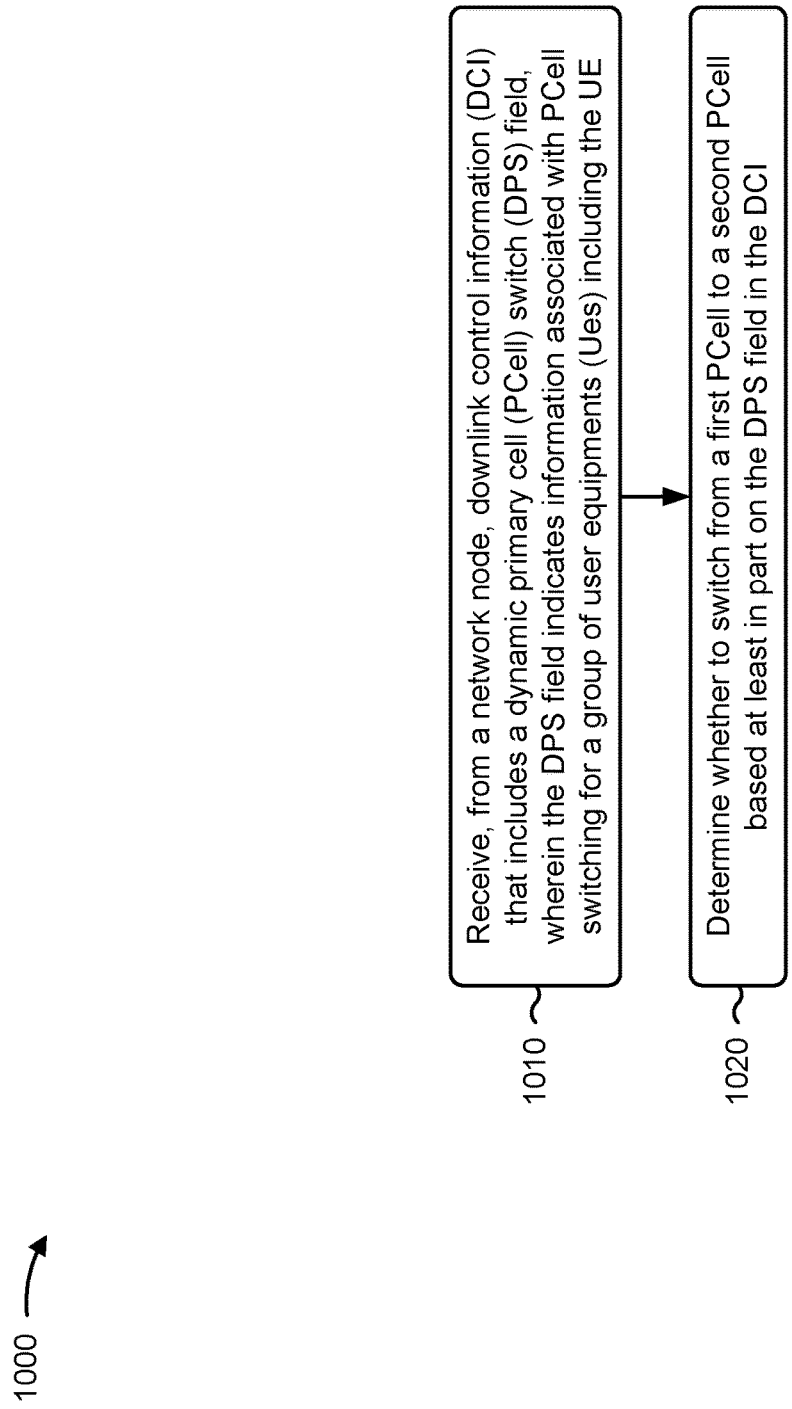
FIGS. 10-11 are diagrams illustrating example processes associated with PCell switching in accordance with DCI, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with PCell switching in accordance with DCI.

As shown in FIG. 10, in some aspects, process 1000 may include receiving, from a network node, DCI that includes a DPS field, wherein the DPS field indicates information associated with PCell switching for a group of UEs including the UE (block 1010). For example, the UE (e.g., using communication manager 140 and/or reception component 1202, depicted in FIG. 12) may receive, from a network node, DCI that includes a DPS field, wherein the DPS field indicates information associated with PCell switching for a group of UEs including the UE, as described above.

As further shown in FIG. 10, in some aspects, process 1000 may include determining whether to switch from a first PCell to a second PCell based at least in part on the DPS field in the DCI (block 1020). For example, the UE (e.g., using communication manager 140 and/or determination component 1208, depicted in FIG. 12) may determine whether to switch from a first PCell to a second PCell based at least in part on the DPS field in the DCI, as described above.

Process 1000 may include additional aspects, such as any single aspect or any combination of aspects described below and/or in connection with one or more other processes described elsewhere herein.

In a first aspect, process 1000 includes receiving the DCI outside of a C-DRX active time.

In a second aspect, alone or in combination with the first aspect, process 1000 includes performing the PCell switching from the first PCell to the second PCell based at least in part on the DPS field in the DCI.

In a third aspect, alone or in combination with one or more of the first and second aspects, the DPS field indicates a PCI associated with the second PCell, and the PCI is associated with a serving SCell to be switched to the second PCell.

In a fourth aspect, alone or in combination with one or more of the first through third aspects, the DPS field indicates a default value to indicate no PCell switching.

In a fifth aspect, alone or in combination with one or more of the first through fourth aspects, the DPS field indicates a PCI of a cell that is not part of active cell groups for the UE, and no PCell switching is assumed based at least in part on the DPS field indicating the PCI of the cell that is not part of the active cell groups for the UE.

In a sixth aspect, alone or in combination with one or more of the first through fifth aspects, the DCI includes a wake-up indication and an SCell dormancy indication for each UE in the group of UEs.

In a seventh aspect, alone or in combination with one or more of the first through sixth aspects, process 1000 includes receiving the DCI inside of a C-DRX active time.

In an eighth aspect, alone or in combination with one or more of the first through seventh aspects, the DCI is a non-fallback DCI with data scheduling, and the DCI includes an SCell dormancy indication per SCell group.

In a ninth aspect, alone or in combination with one or more of the first through eighth aspects, process 1000 includes determining whether the first PCell is associated with a dormant SCell based at least in part on the SCell dormancy indication per SCell group.

In a tenth aspect, alone or in combination with one or more of the first through ninth aspects, the DCI is without data scheduling, and the DCI includes an SCell dormancy indication per SCell.

In an eleventh aspect, alone or in combination with one or more of the first through tenth aspects, a deactivation or dormancy of the first PCell is indicated using a bit in the DCI associated with the second PCell, and the bit is associated with a serving SCell to be switched to the second PCell.

In a twelfth aspect, alone or in combination with one or more of the first through eleventh aspects, the DCI is with data scheduling or without data scheduling, and the DCI includes a bit to indicate whether the first PCell is associated with a dormant SCell.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
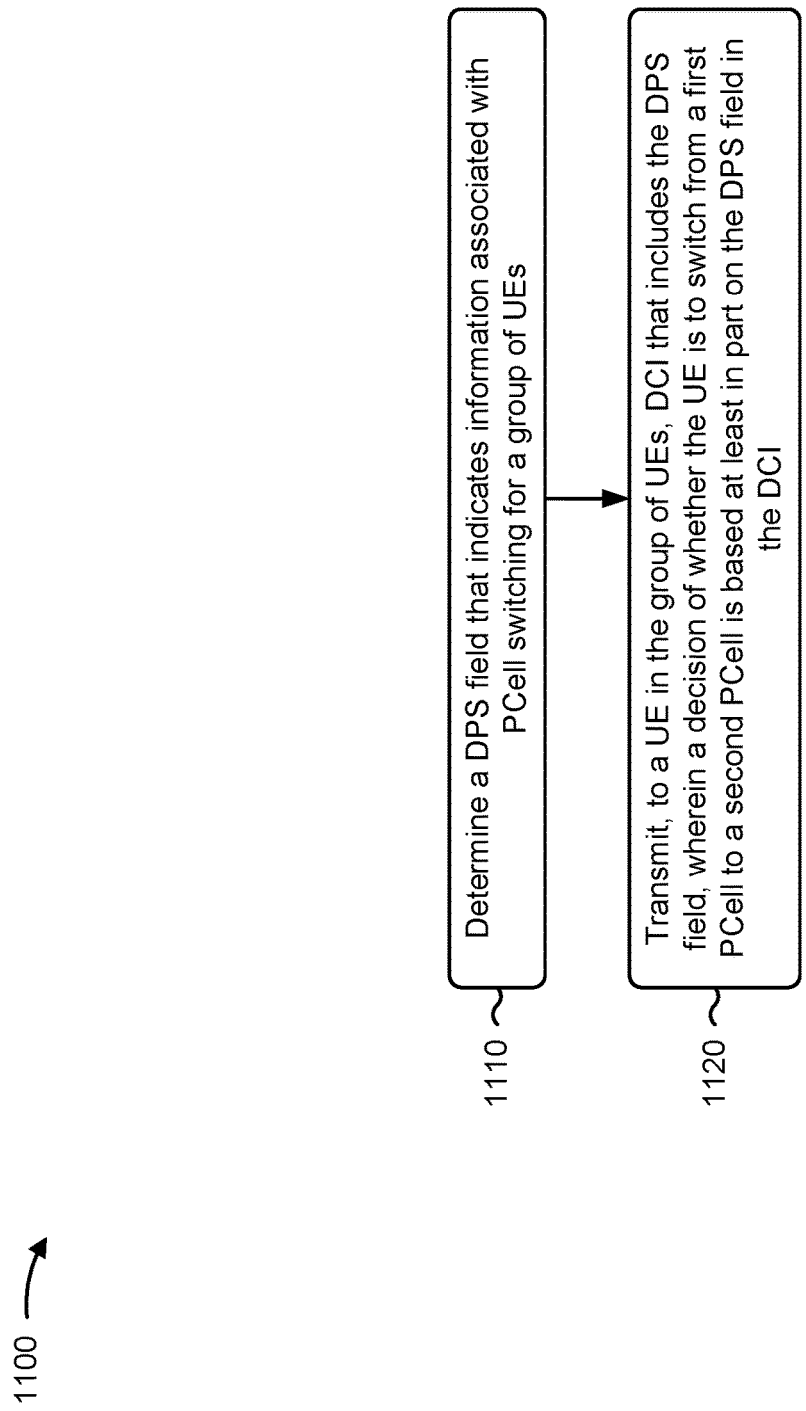

FIG. 11 is a diagram illustrating an example process 1100 performed, for example, by a network node, in accordance with the present disclosure. Example process 1100 is an example where the network node (e.g., base station 110) performs operations associated with PCell switching in accordance with DCI.

As shown in FIG. 11, in some aspects, process 1100 may include determining a DPS field that indicates information associated with PCell switching for a group of UEs (block 1110). For example, the network node (e.g., using communication manager 150 and/or determination component 1308, depicted in FIG. 13) may determine a DPS field that indicates information associated with PCell switching for a group of UEs, as described above.

As further shown in FIG. 11, in some aspects, process 1100 may include transmitting, to a UE in the group of UEs, DCI that includes the DPS field, wherein a decision of whether the UE is to switch from a first PCell to a second PCell is based at least in part on the DPS field in the DCI (block 1120). For example, the network node (e.g., using communication manager 150 and/or transmission component 1304, depicted in FIG. 13) may transmit, to a UE in the group of UEs, DCI that includes the DPS field, wherein a decision of whether the UE is to switch from a first PCell to a second PCell is based at least in part on the DPS field in the DCI, as described above.

Process 1100 may include additional aspects, such as any single aspect or any combination of aspects described below and/or in connection with one or more other processes described elsewhere herein.

In one aspect, process 1100 includes transmitting the DCI outside of a C-DRX active time, or transmitting the DCI inside of the C-DRX active time.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
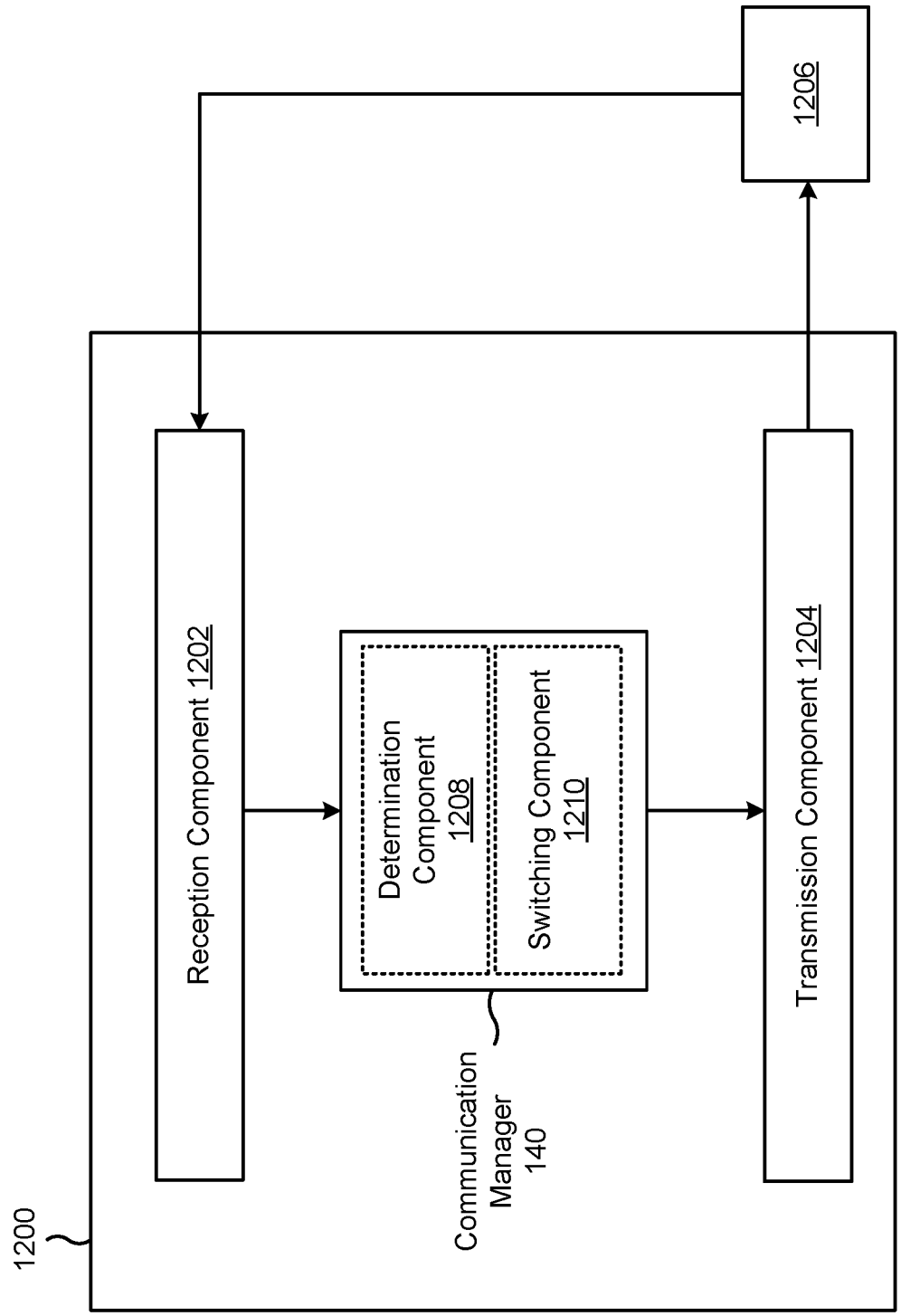
FIGS. 12-13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of a determination component 1208, or a switching component 1210, among other examples.

In some aspects, the apparatus 1200 may be configured to perform one or more operations described herein in connection with FIGS. 8-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The reception component 1202 may receive, from a network node, DCI that includes a DPS field, wherein the DPS field indicates information associated with PCell switching for a group of UEs including the UE. The determination component 1208 may determine whether to switch from a first PCell to a second PCell based at least in part on the DPS field in the DCI. The switching component 1210 may perform the PCell switching from the first PCell to the second PCell based at least in part on the DPS field in the DCI.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
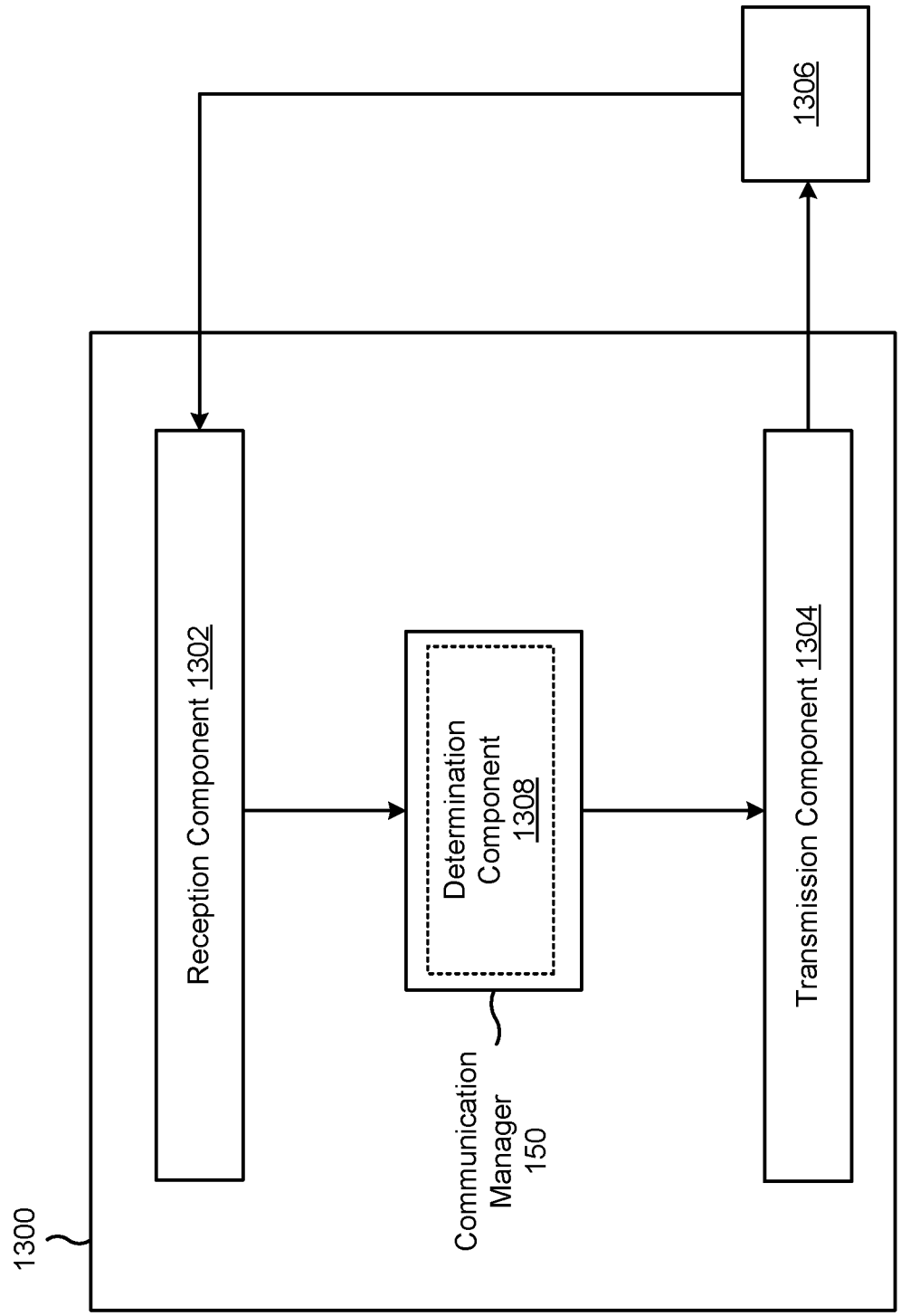

FIG. 13 is a diagram of an example apparatus 1300 for wireless communication. The apparatus 1300 may be a network node, or a network node may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a determination component 1308, among other examples.

In some aspects, the apparatus 1300 may be configured to perform one or more operations described herein in connection with FIGS. 8-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the base station described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the base station described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the base station described in connection with FIG. 2. In some aspects, the transmission component 1304 may be co-located with the reception component 1302 in a transceiver.

The determination component 1308 may determine a DPS field that indicates information associated with PCell switching for a group of UEs. The transmission component 1304 may transmit, to a UE in the group of UEs, DCI that includes the DPS field, wherein a decision of whether the UE is to switch from a first PCell to a second PCell is based at least in part on the DPS field in the DCI.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
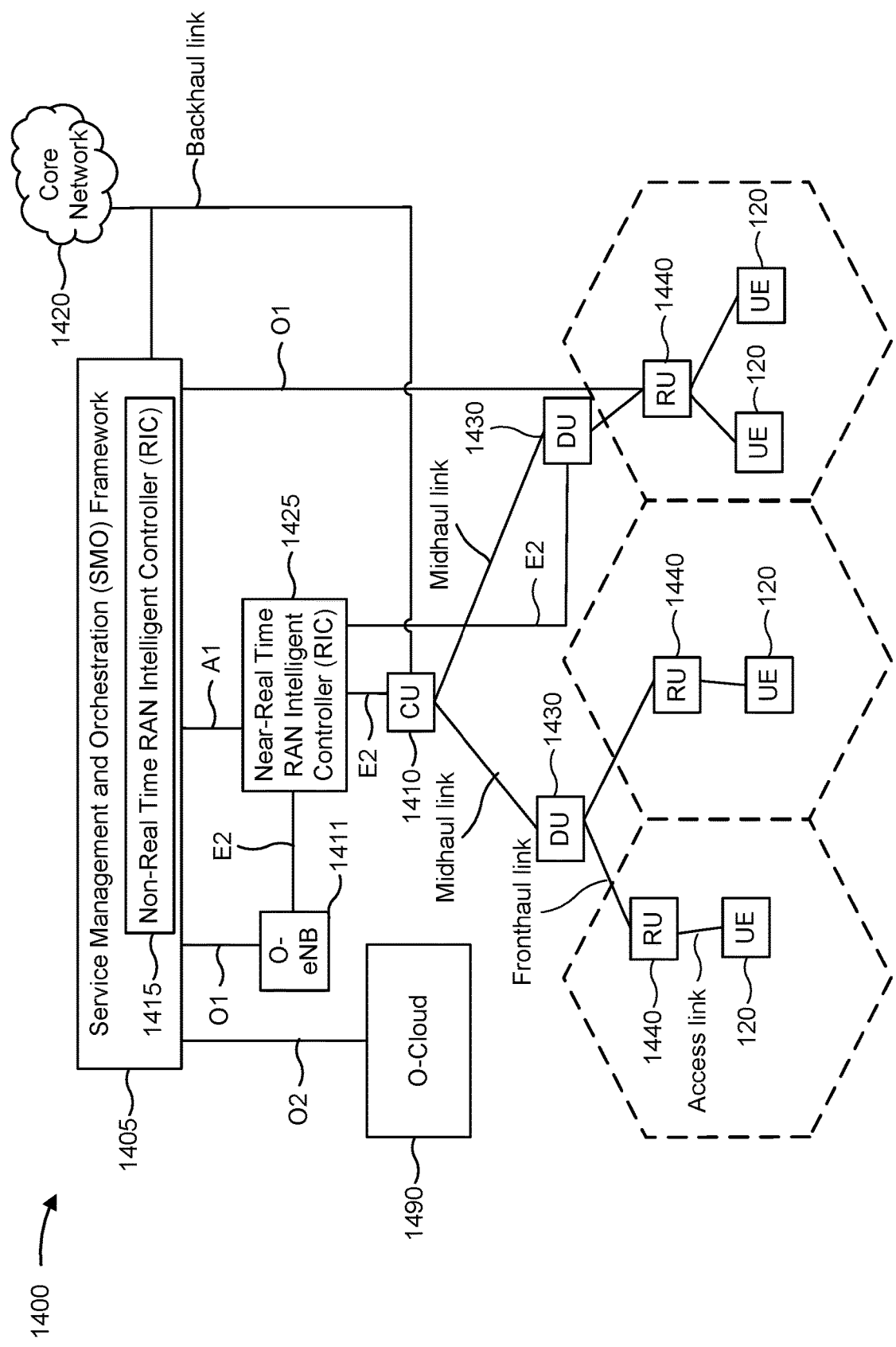
FIG. 14 is a diagram illustrating an example of a disaggregated base station architecture, in accordance with the present disclosure.

FIG. 14 is a diagram illustrating an example 1400 of a disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual centralized unit (VCU), a virtual distributed unit (VDU), or a virtual radio unit (VRU)).

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 14 may include one or more CUs 1410 that can communicate directly with a core network 1420 via a backhaul link, or indirectly with the core network 1420 through one or more disaggregated base station units (such as a Near-RT RIC 1425 via an E2 link, or a Non-RT RIC 1415 associated with a Service Management and Orchestration (SMO) Framework 1405, or both). A CU 1410 may communicate with one or more DUs 1430 via respective midhaul links, such as an F1 interface. The DUs 1430 may communicate with one or more RUs 1440 via respective fronthaul links. The RUs 1440 may communicate with respective UEs 120 via one or more radio frequency (RF) access links. In some implementations, the UE 120 may be simultaneously served by multiple RUs 1440.

Each of the units (e.g., the CUs 1410, the DUs 1430, the RUs 1440), as well as the Near-RT RICs 1425, the Non-RT RICs 1415, and the SMO Framework 1405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 1410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1410. The CU 1410 may be configured to handle user plane functionality (e.g., Central Unit-User Plane (CU-UP)), control plane functionality (e.g., Central Unit-Control Plane (CU-CP)), or a combination thereof. In some implementations, the CU 1410 can be logically split into one or more CU-UP units and one or more CU-CP units. The CU-UP unit can communicate bidirectionally with the CU-CP unit via an interface, such as the E1 interface when implemented in an O-RAN configuration. The CU 1410 can be implemented to communicate with the DU 1430, as necessary, for network control and signaling.

The DU 1430 may correspond to a logical unit that includes one or more base station functions to control the operation of one or more RUs 1440. In some aspects, the DU 1430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 1430 may further host one or more low-PHY layers. Each layer (or module) can be implemented with an interface configured to communicate signals with other layers (and modules) hosted by the DU 1430, or with the control functions hosted by the CU 1410.

Lower-layer functionality can be implemented by one or more RUs 1440. In some deployments, an RU 1440, controlled by a DU 1430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 1440 can be implemented to handle over the air (OTA) communication with one or more UEs 120. In some implementations, real-time and non-real-time aspects of control and user plane communication with the RU(s) 1440 can be controlled by the corresponding DU 1430. In some scenarios, this configuration can enable the DU(s) 1430 and the CU 1410 to be implemented in a cloud-based RAN architecture, such as a vRAN architecture.

The SMO Framework 1405 may be configured to support RAN deployment and provisioning of non-virtualized and virtualized network elements. For non-virtualized network elements, the SMO Framework 1405 may be configured to support the deployment of dedicated physical resources for RAN coverage requirements which may be managed via an operations and maintenance interface (such as an O1 interface). For virtualized network elements, the SMO Framework 1405 may be configured to interact with a cloud computing platform (such as an open cloud (O-Cloud) 1490) to perform network element life cycle management (such as to instantiate virtualized network elements) via a cloud computing platform interface (such as an O2 interface).

Such virtualized network elements can include, but are not limited to, CUs 1410, DUs 1430, RUs 1440 and Near-RT RICs 1425. In some implementations, the SMO Framework 1405 can communicate with a hardware aspect of a 4G RAN, such as an open eNB (O-eNB) 1411, via an O1 interface. Additionally, in some implementations, the SMO Framework 1405 can communicate directly with one or more RUs 1440 via an O1 interface. The SMO Framework 1405 also may include a Non-RT RIC 1415 configured to support functionality of the SMO Framework 1405.

The Non-RT RIC 1415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1425. The Non-RT RIC 1415 may be coupled to or communicate with (such as via an A1 interface) the Near-RT RIC 1425. The Near-RT RIC 1425 may be configured to include a logical function that enables near-real-time control and optimization of RAN elements and resources via data collection and actions over an interface (such as via an E2 interface) connecting one or more CUs 1410, one or more DUs 1430, or both, as well as an O-eNB, with the Near-RT RIC 1425.

In some implementations, to generate AI/ML models to be deployed in the Near-RT RIC 1425, the Non-RT RIC 1415 may receive parameters or external enrichment information from external servers. Such information may be utilized by the Near-RT RIC 1425 and may be received at the SMO Framework 1405 or the Non-RT RIC 1415 from non-network data sources or from network functions. In some examples, the Non-RT RIC 1415 or the Near-RT RIC 1425 may be configured to tune RAN behavior or performance. For example, the Non-RT RIC 1415 may monitor long-term trends and patterns for performance and employ AI/ML models to perform corrective actions through the SMO Framework 1405 (such as reconfiguration via 01) or via creation of RAN management policies (such as A1 policies).

As indicated above, FIG. 14 is provided as an example. Other examples may differ from what is described with regard to FIG. 14.

The following provides an overview of some Aspects of the present disclosure:

Aspect 1: A method of wireless communication performed by a user equipment (UE), comprising: receiving, from a network node, downlink control information (DCI) that includes a dynamic primary cell (PCell) switch (DPS) field, wherein the DPS field indicates information associated with PCell switching for a group of UEs including the UE; and determining whether to switch from a first PCell to a second PCell based at least in part on the DPS field in the DCI.

Aspect 2: The method of Aspect 1, wherein receiving the DCI that includes the DPS field comprises receiving the DCI outside of a connected mode discontinuous reception active time.

Aspect 3: The method of any of Aspects 1 through 2, further comprising performing the PCell switching from the first PCell to the second PCell based at least in part on the DPS field in the DCI.

Aspect 4: The method of any of Aspects 1 through 3, wherein the DPS field indicates a physical cell identifier (PCI) associated with the second PCell, and wherein the PCI is associated with a serving secondary cell to be switched to the second PCell.

Aspect 5: The method of any of Aspects 1 through 4, wherein the DPS field indicates a default value to indicate no PCell switching.

Aspect 6: The method of any of Aspects 1 through 5, wherein the DPS field indicates a physical cell identifier (PCI) of a cell that is not part of active cell groups for the UE, and no PCell switching is assumed based at least in part on the DPS field indicating the PCI of the cell that is not part of the active cell groups for the UE.

Aspect 7: The method of any of Aspects 1 through 6, wherein the DCI includes a wake-up indication and a secondary cell dormancy indication for each UE in the group of UEs.

Aspect 8: The method of any of Aspects 1 through 7, wherein receiving the DCI that includes the DPS field comprises receiving the DCI inside of a connected mode discontinuous reception active time.

Aspect 9: The method of any of Aspects 1 through 8, wherein the DCI is a non-fallback DCI with data scheduling, and wherein the DCI includes a secondary cell (SCell) dormancy indication per SCell group.

Aspect 10: The method of Aspect 9, further comprising determining whether the first PCell is associated with a dormant SCell based at least in part on the SCell dormancy indication per SCell group.

Aspect 11: The method of any of Aspects 1 through 10, wherein the DCI is without data scheduling, and wherein the DCI includes a secondary cell (SCell) dormancy indication per SCell.

Aspect 12: The method of Aspect 11, wherein a deactivation or dormancy of the first PCell is indicated using a bit in the DCI associated with the second PCell, and wherein the bit is associated with a serving SCell to be switched to the second PCell.

Aspect 13: The method of any of Aspects 1 through 12, wherein the DCI is with data scheduling or without data scheduling, and wherein the DCI includes a bit to indicate whether the first PCell is associated with a dormant secondary cell.

Aspect 14: A method of wireless communication performed by a network node, comprising: determining a dynamic primary cell (PCell) switch (DPS) field that indicates information associated with PCell switching for a group of user equipments (UEs); and transmitting, to a UE in the group of UEs, downlink control information (DCI) that includes the DPS field, wherein a decision of whether the UE is to switch from a first PCell to a second PCell is based at least in part on the DPS field in the DCI.

Aspect 15: The method of Aspect 14, wherein transmitting the DCI that includes the DPS field comprises: transmitting the DCI outside of a connected mode discontinuous reception (C-DRX) active time; or transmitting the DCI inside of the C-DRX active time.

Aspect 16: An apparatus for wireless communication at a device, comprising a processor; memory coupled with the processor; and instructions stored in the memory and executable by the processor to cause the apparatus to perform the method of one or more of Aspects 1-13.

Aspect 17: A device for wireless communication, comprising a memory and one or more processors coupled to the memory, the one or more processors configured to perform the method of one or more of Aspects 1-13.

Aspect 18: An apparatus for wireless communication, comprising at least one means for performing the method of one or more of Aspects 1-13.

Aspect 19: A non-transitory computer-readable medium storing code for wireless communication, the code comprising instructions executable by a processor to perform the method of one or more of Aspects 1-13.

Aspect 20: A non-transitory computer-readable medium storing a set of instructions for wireless communication, the set of instructions comprising one or more instructions that, when executed by one or more processors of a device, cause the device to perform the method of one or more of Aspects 1-13.

Aspect 21: An apparatus for wireless communication at a device, comprising a processor; memory coupled with the processor; and instructions stored in the memory and executable by the processor to cause the apparatus to perform the method of one or more of Aspects 14-15.

Aspect 22: A device for wireless communication, comprising a memory and one or more processors coupled to the memory, the one or more processors configured to perform the method of one or more of Aspects 14-15.

Aspect 23: An apparatus for wireless communication, comprising at least one means for performing the method of one or more of Aspects 14-15.

Aspect 24: A non-transitory computer-readable medium storing code for wireless communication, the code comprising instructions executable by a processor to perform the method of one or more of Aspects 14-15.

Aspect 25: A non-transitory computer-readable medium storing a set of instructions for wireless communication, the set of instructions comprising one or more instructions that, when executed by one or more processors of a device, cause the device to perform the method of one or more of Aspects 14-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

a memory; and
one or more processors, coupled to the memory, configured to:
receive, from a network node, downlink control information (DCI) that includes a dynamic primary cell (PCell) switch (DPS) field, wherein the DPS field indicates information associated with PCell switching for a group of UEs including the UE;
determine whether to switch from a first PCell to a second PCell based at least in part on the DPS field in the DCI; and
switch the first PCell to a dormant secondary cell (SCell) based on the determination.

2. The apparatus of claim 1, wherein the one or more processors, to receive the DCI that includes the DPS field, are configured to receive the DCI outside of a connected mode discontinuous reception active time.

3. The apparatus of claim 1, wherein the one or more processors are further configured to perform the PCell switching from the first PCell to the second PCell based at least in part on the DPS field in the DCI.

4. The apparatus of claim 1, wherein the DPS field indicates a physical cell identifier (PCI) associated with the second PCell, and wherein the PCI is associated with a serving secondary cell to be switched to the second PCell.

5. The apparatus of claim 1, wherein the DPS field indicates a default value to indicate no PCell switching.

6. The apparatus of claim 1, wherein the DPS field indicates a physical cell identifier (PCI) of a cell that is not part of active cell groups for the UE, and no PCell switching is assumed based at least in part on the DPS field indicating the PCI of the cell that is not part of the active cell groups for the UE.

7. The apparatus of claim 1, wherein the DCI includes a wake-up indication and a secondary cell dormancy indication for each UE in the group of UEs.

8. The apparatus of claim 1, wherein the one or more processors, to receive the DCI that includes the DPS field, are configured to receive the DCI inside of a connected mode discontinuous reception active time.

9. The apparatus of claim 1, wherein the DCI is a non-fallback DCI with data scheduling, and wherein the DCI includes a SCell dormancy indication per SCell group.

10. The apparatus of claim 9, wherein the one or more processors are further configured to determine whether the first PCell is associated with the dormant SCell based at least in part on the SCell dormancy indication per SCell group.

11. The apparatus of claim 1, wherein the DCI is without data scheduling, and wherein the DCI includes a SCell dormancy indication per SCell.

12. The apparatus of claim 11, wherein a deactivation or dormancy of the first PCell is indicated using a bit in the DCI associated with the second PCell, and wherein the bit is associated with a serving SCell to be switched to the second PCell.

13. The apparatus of claim 1, wherein the DCI is with data scheduling or without data scheduling, and wherein the DCI includes a bit to indicate whether the first PCell is associated with the dormant SCell.

14. An apparatus for wireless communication at a network node, comprising:
a memory; and
one or more processors, coupled to the memory, configured to:
determine a dynamic primary cell (PCell) switch (DPS) field that indicates information associated with PCell switching for a group of user equipments (UEs); and
transmit, to a UE in the group of UEs, downlink control information (DCI) that includes the DPS field, wherein a decision of whether the UE is to: (i) switch from a first PCell to a second PCell and (ii) switch the first PCell to a dormant secondary cell (SCell) is based at least in part on the DPS field in the DCI.

15. The apparatus of claim 14, wherein the one or more processors, to transmit the DCI that includes the DPS field, are configured to:
transmit the DCI outside of a connected mode discontinuous reception (C-DRX) active time; or
transmit the DCI inside of the C-DRX active time.

16. A method of wireless communication performed by a user equipment (UE), comprising:
receiving, from a network node, downlink control information (DCI) that includes a dynamic primary cell (PCell) switch (DPS) field, wherein the DPS field indicates information associated with PCell switching for a group of UEs including the UE;
determining whether to switch from a first PCell to a second PCell based at least in part on the DPS field in the DCI; and
switching the first PCell to a dormant secondary cell (SCell) based on the determination.

17. The method of claim 16, wherein receiving the DCI that includes the DPS field comprises receiving the DCI outside of a connected mode discontinuous reception active time.

18. The method of claim 16, further comprising performing the PCell switching from the first PCell to the second PCell based at least in part on the DPS field in the DCI.

19. The method of claim 16, wherein the DPS field indicates a physical cell identifier (PCI) associated with the second PCell, and wherein the PCI is associated with a serving secondary cell to be switched to the second PCell.

20. The method of claim 16, wherein the DPS field indicates a default value to indicate no PCell switching.

21. The method of claim 16, wherein the DPS field indicates a physical cell identifier (PCI) of a cell that is not part of active cell groups for the UE, and no PCell switching is assumed based at least in part on the DPS field indicating the PCI of the cell that is not part of the active cell groups for the UE.

22. The method of claim 16, wherein the DCI includes a wake-up indication and a secondary cell dormancy indication for each UE in the group of UEs.

23. The method of claim 16, wherein receiving the DCI that includes the DPS field comprises receiving the DCI inside of a connected mode discontinuous reception active time.

24. The method of claim 16, wherein the DCI is a non-fallback DCI with data scheduling, and wherein the DCI includes a e SCell dormancy indication per SCell group.

25. The method of claim 24, further comprising determining whether the first PCell is associated with the dormant SCell based at least in part on the SCell dormancy indication per SCell group.

26. The method of claim 16, wherein the DCI is without data scheduling, and wherein the DCI includes a SCell dormancy indication per SCell.

27. The method of claim 26, wherein a deactivation or dormancy of the first PCell is indicated using a bit in the DCI associated with the second PCell, and wherein the bit is associated with a serving SCell to be switched to the second PCell.

28. The method of claim 16, wherein the DCI is with data scheduling or without data scheduling, and wherein the DCI includes a bit to indicate whether the first PCell is associated with the dormant SCell.

29. A method of wireless communication performed by a network node, comprising:
- determining a dynamic primary cell (PCell) switch (DPS) field that indicates information associated with PCell switching for a group of user equipments (UEs); and
- transmitting, to a UE in the group of UEs, downlink control information (DCI) that includes the DPS field, wherein a decision of whether the UE is to (ii) switch from a first PCell to a second PCell and (ii) switch the first PCell to a dormant secondary cell (SCell) is based at least in part on the DPS field in the DCI.

30. The method of claim 29, wherein transmitting the DCI that includes the DPS field comprises:
- transmitting the DCI outside of a connected mode discontinuous reception (C-DRX) active time; or
- transmitting the DCI inside of the C-DRX active time.

* * * * *